Nov. 17, 1959 — F. D. PFENING — 2,913,279
METHOD AND APPARATUS FOR HANDLING FLOUR
Filed March 26, 1957 — 5 Sheets-Sheet 1

INVENTOR.
Frederic D. Pfening.
BY Schmieding and Fultz
ATTORNEYS

Nov. 17, 1959 F. D. PFENING 2,913,279
METHOD AND APPARATUS FOR HANDLING FLOUR
Filed March 26, 1957 5 Sheets-Sheet 3

INVENTOR.
Frederic D. Pfening.
BY
Schmieding and Fultz
ATTORNEYS

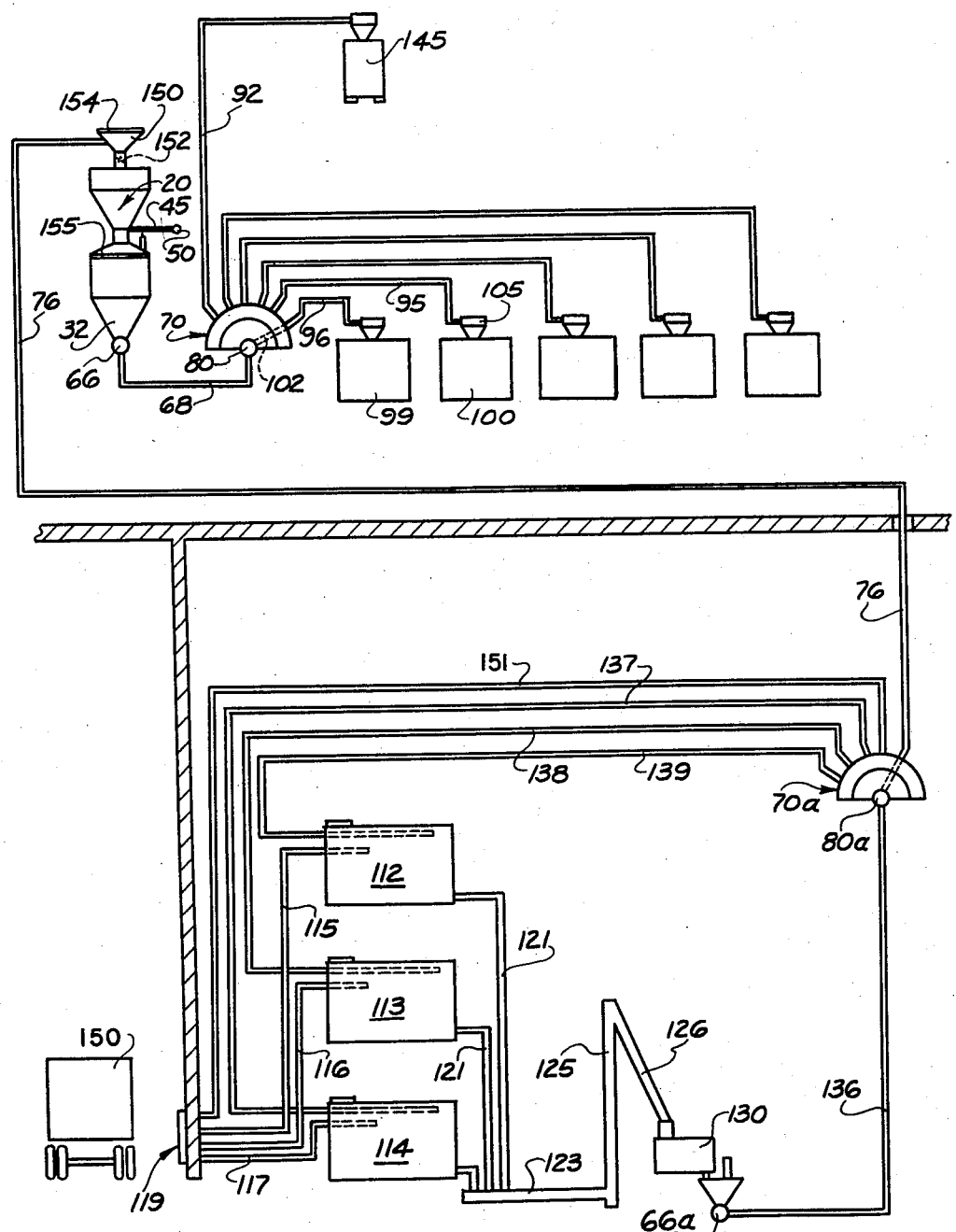

United States Patent Office 2,913,279
Patented Nov. 17, 1959

2,913,279

METHOD AND APPARATUS FOR HANDLING FLOUR

Frederic D. Pfening, Columbus, Ohio, assignor to The Fred D. Pfening Co., Columbus, Ohio, a corporation of Ohio Application March 26, 1957, Serial No. 648,746

20 Claims. (Cl. 302—28)

This invention relates to novel method and apparatus for the automatic handling of finely divided particles such as flour or other ingredients used in large scale bakery operations.

This application is a continuation-in-part of my co-pending application Serial Number 582,378 filed May 3, 1956, now abandoned.

The invention is described and illustrated as being applied to a novel flour handling system for a bakery but it is not intended to limit the invention to the handling of this particular ingredient. With this system various types of flour may be automatically transferred from a transporting vehicle to various storage compartments of the bakery. The various flour types can be selectively automatically transferred from the storage compartments through a sifter in which a sifting operation is performed. When the operator in the mixing room desires flour from one or the other of such storage bins he can automatically transfer same from the particular bin selected, through conduits to the sifter and then to a scale hopper. When the desired weight is obtained, the flow of flour to the scale hopper is automatically cut off to a weight within ounces of the scale setting. Any flour remaining in the conduit is automatically caused to by-pass the scale hopper and is returned to a surge hopper from which it can be delivered to the scale hopper as part of the next charge, or returned to the storage compartment as desired.

After a charge of flour, of the appropriate weight, has been delivered to the scale hopper, a discharge valve mechanism is automatically opened to deliver the weighed charge of flour from the scale hopper to a second hopper or receiver. The valve mechanism between the scale hopper and receiver is then closed and the operator institutes the automatic transfer of flour from the receiver to one of a plurality of sponge mixers. The operator can select the dough mixer to which flour is delivered by setting an appropriate multiple outlet valve mechanism. At the same time flour is being delivered from the receiver to one of the dough mixers, the operator again institutes delivery of flour to the scale hopper until a second charge of appropriate weight has been received by the scale hopper. By that time the receiver is cleared of the previously delivered charge. The cycle is repeated, with the second weighed charge of flour being automatically delivered to another of the plurality of dough mixers. During delivery of this second weighed charge, the scale hopper is simultaneously utilized to receive and weigh a third charge of flour from the storage compartment.

It will therefore be understood that by employing the method and apparatus in the manner described, the operator can utilize a single scale hopper to successively supply weighed charges of flour to a plurality of individual dough mixers without loss of time and with a minimum of components of equipment. Hence the disadvantages and expense of a plurality of separate scale hoppers, one over each mixer, or the movement of a single scale hopper to a plurality of mixer locations, are thereby eliminated.

It is an object of the present invention to provide improved method and apparatus for the automatic handling of flour from storage compartments in a bakery through various necessary operations, including the accurate weighing of charges thereof, and then to a plurality of individual dough mixers.

It is another object of the present invention to provide improved method and apparatus whereby a single scale hopper can be utilized to successively supply weighed charges of flour to each of a plurality of dough mixers.

It is still another object of the present invention to provide an improved apparatus whereby a single scale hopper can be utilized to supply weighed charges of flour to each of a plurality of dough mixers, and whereby the scale hopper is charged by pneumatically conveyed flour delivered from a storage source without the need for a return conduit for returning excess flour in the delivery conduit to the storage source.

Further objects and advantages of the present invention will be apparent from the following description, reference being had to the accompanying drawings wherein preferred forms of embodiment of the invention are clearly shown.

In the drawings:

Figure 8 is a second diagrammatic view showing a second flour handling system constructed according to the present invention and comprising a second aspect thereof.

Figure 1:
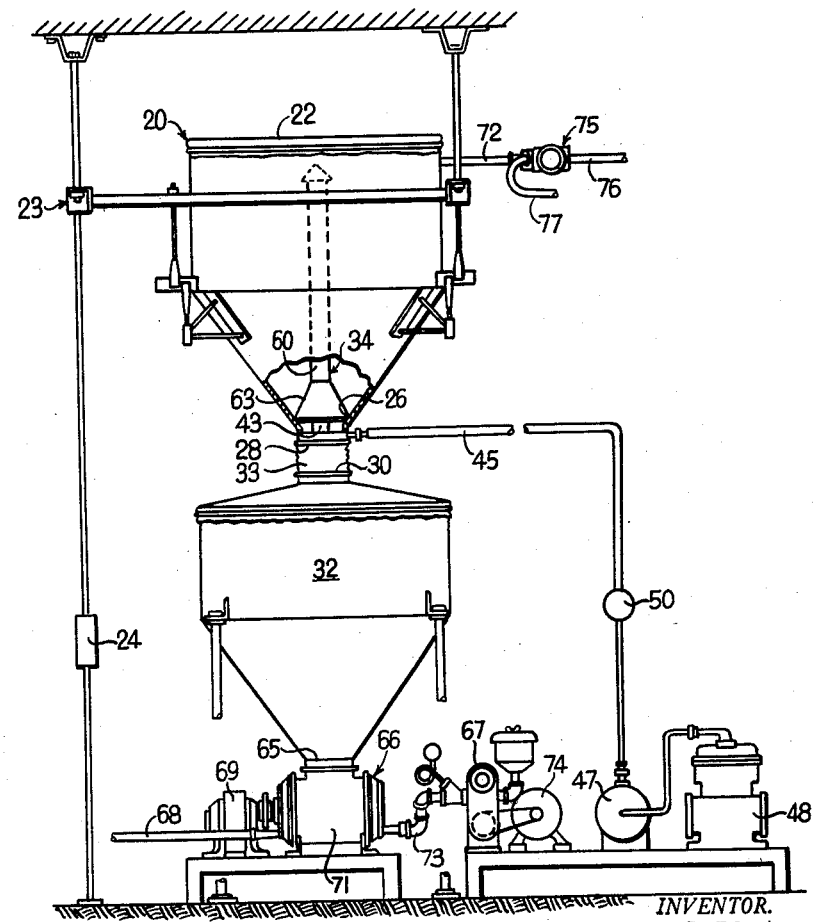
Figure 1 is a side elevation view of a scale hopper for weighing charges of flour together with associated apparatus with such hopper and apparatus being constructed according to the present invention.

Referring next to the drawing, Figure 1 illustrates a scale hopper and associated apparatus with the scale hopper being indicated generally to be 20. Hopper 20 is suspended from a ceiling 22 by a suitable suspension structure indicated generally at 23. Suspension structure 23 includes conventional scale means for weighing the contents of hopper 20 including a scale beam indicated at 24.

Scale hopper 20 is provided with a discharge opening 28 which communicates with an intake opening 30 of a receiver, indicated generally at 32, at a flexible connector 33. The lower end of hopper 20 includes a suitable discharge valve mechanism indicated generally at 34. This valve mechanism is described in detail in my co-pending application Serial No. 564,831 filed February 10, 1956, now Patent No. 2,858,966, November 4, 1958. In general this valve type includes a pneumatically actuated piston and cylinder assembly 43 which is arranged to raise a conically shaped valve member 63 away from a seat portion 26 when the cylinder assembly 43 is pressurized by the introduction of air through a line 45.

Air is supplied to line 45 from a suitable source such as a tank 47 and a compressor 48. A suitable air control valve 50 is located along line 45 for controlling the flow of air to the pneumatically operated discharge mechanism 34.

It should be further pointed out that, as described in detail in my co-pending application Serial No. 564,831 filed February 10, 1956, the pneumatic valve mechanism 34 includes a vertically extending tubular member 60 which extends upwardly through the contents of scale hopper 20 to the vicinity of a filtered air vent 22. Such tubular member 60 provides a conduit for the escape of air from receiver 32 upwardly through the contents of scale hopper 20 and out through air vent 22. Such air escape conduit is provided for the release of air displaced from receiver 32 when discharge valve mechanism 34 is open and a charge of flour is being delivered from scale hopper 22 to receiver 32.

The lower end of receiver 32 includes a discharge opening 65 which communicates with the intake of a suitable pneumatic flour translating apparatus such as a rotary feeder 66 and blower 67, the outlet of rotary feeder 66 being connected with a conduit 68 leading to a multiple outlet valve mechanism 70 later to be described in connection with Figure 3.

Rotary feeder 66 includes a cylindrical compartment 71 containing a shaft and radially extending blades, not illustrated. A motor 69 rotates the shaft and blades to successively align compartments of flour with the air flow from a conduit 73 leading from blower 67. The flow of air picks up flour from the rotating compartments in cylinder 71 of rotary feeder 66 and conveys the flour into and along discharge conduit 68 leading from rotary feeder 66. A motor 74 is provided for driving the blower 67.

Figure 2:
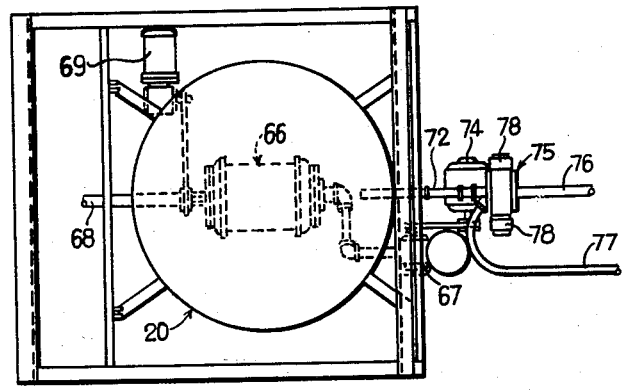
Figure 2 is a top elevational view of the apparatus of Figure 1.

With continued reference to Figures 1 and 2, flour is delivered to the upper portion of scale hopper 20 by an intake conduit 72. A valve indicated generally at 75 serves to connect a conduit 76, leading from a flour supply and sifter, later to be described with either the intake conduit 72 or a return conduit 77 leading back to the flour supply. Valve 75 is of the 2-way type and may be operated by solenoids 78, the latter being connected to a source of electrical energy and provided with suitable control mechanism not illustrated. When one of the solenoids 78 is energized conduit 76 is connected only to conduit 72 whereby flour is delivered to scale hopper 20. When the other of solenoids 78 is energized, conduit 76 is connected only to return conduit 77 whereby the flow of flour in conduit 76 can instantly be diverted by the operator and returned to the supply. Hence it will be understood that the charge of flour delivered to scale hopper 20 can be very accurately controlled, to within ounces, due to the fact that the incoming flow of flour can be instantly diverted, by valve 75, from intake conduit 72 to return conduit 77.

Figure 3:
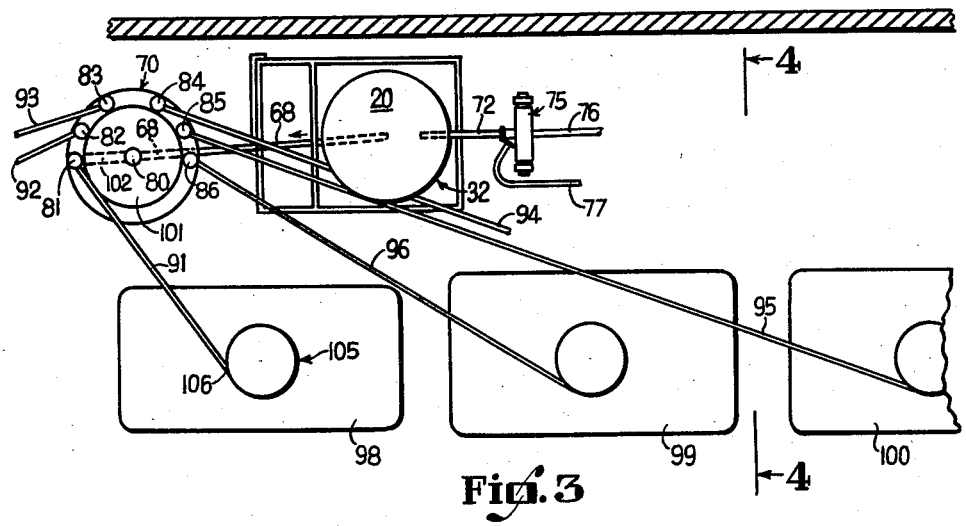
Figure 3 is a diagrammatic plan view showing the scale hopper apparatus of Figures 1 and 2 together with a plurality of dough mixers comprising a portion of the system of the present invention.
Figure 4:
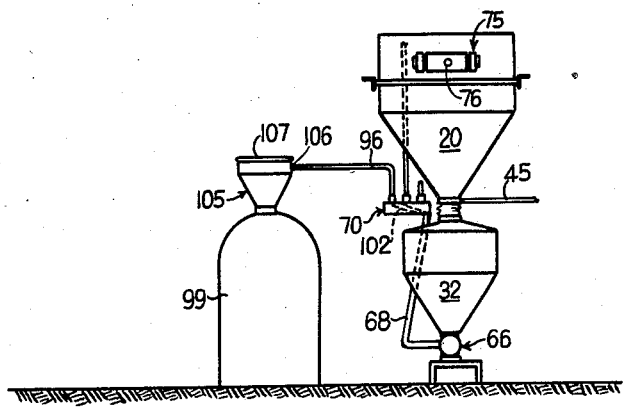
Figure 4 is an elevational view of the apparatus of Figure 3.

Reference is next made to Figure 3 which is a schematic plan view of a mixing room of a bakery with the scale hopper 20 being illustrated as viewed from the top. The previously mentioned receiver 32 is positioned below the scale hopper as shown in the elevational view of Figure 4. The outlet conduit 68 from rotary feeder 66 is shown connected to a central intake opening 80 of a multiple outlet valve mechanism 70 having six outlet openings 81, 82, 83, 84, 85, and 86. Each of these outlet openings communicate with conduits 91, 92, 93, 94, 95, and 96. Certain of these conduits each leads to a separate dough mixer. For example, conduit 91 leads to a mixer 98, conduit 96 leads to a mixer 99, and conduit 95 leads to a mixer 100. Hence it is seen, from Figure 3, that when a central rotatable portion 101 is set, by the operator, so that a passage 102 therein connects valve intake opening 80 with a valve discharge opening 81, the conduit 68 of the rotary feeder 66 is placed in communication with conduit 91 leading to mixer 98 and a weighed charge of flour is delivered from receiver 32 to mixer 98. As is best seen in Figure 4, each of the mixers, such as 99, may be provided with a cyclonette, indicated generally at 105, and having an intake opening 106 arranged to discharge the flow of flour from line 96 tangentially against an inner surface of the cyclonette 105 whereby the velocity of the flowing stream of air and flour is dissipated by swirling action before leaving the cyclonette and entering the mixer at 108. Air can escape from a filtered vent 107 in the top of the cyclonette.

Figure 5:
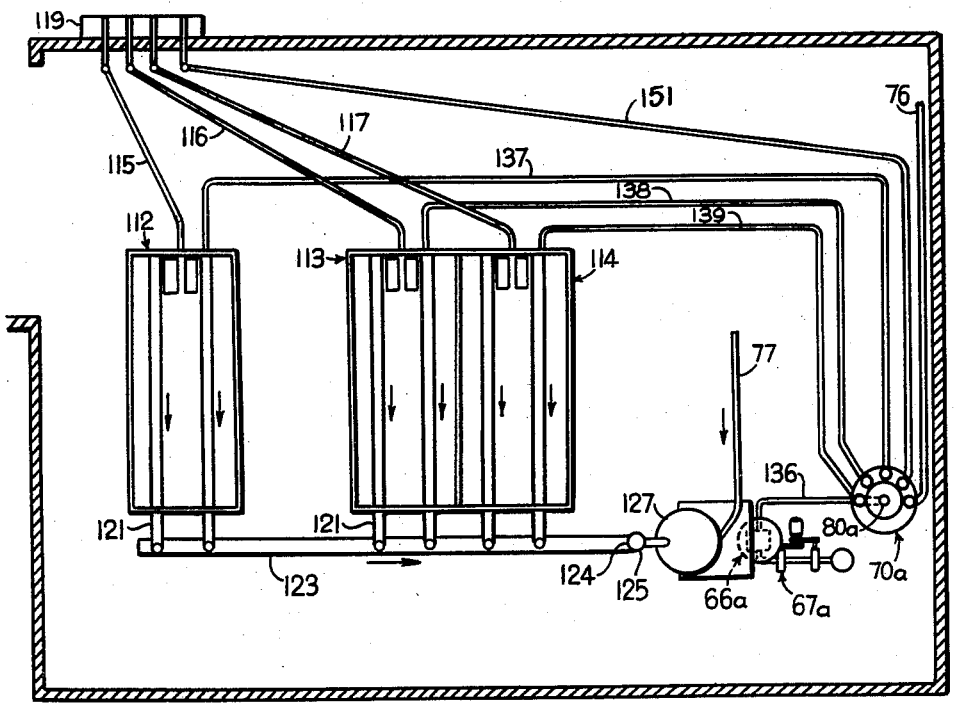
Figure 5 is a plan view of flour storage compartments and sifting apparatus comprising a portion of the system of the present invention.
Figure 6:
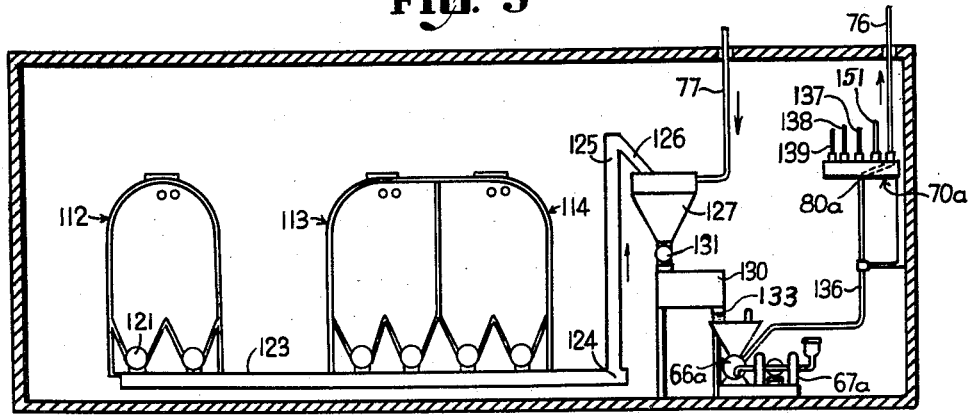
Figure 6 is an elevational view of the apparatus of Figure 5.

Reference is next made to Figures 5 and 6 which illustrate the flour storage area of the present system together with associated apparatus utilized therewith. Figures 5 and 6 may be thought of as representing the basement of a bakery. The previously described weighing and mixing apparatus of Figures 1 through 4 can be located on the floor above the apparatus of Figures 5 and 6.

A plurality of storage compartments, indicated generally at 112, 113, and 114 can be filled by the conduits 115, 116, and 117, respectively, which conduits communicate with a trailer connection panel indicated generally at 119. Trailer connection panel 119 may be provided with suitable pneumatic flour transporting means, not illustrated, whereby flour can be transferred from the compartment of a delivery vehicle to the storage bins 112, 113, 114. The bottom of the storage bins are provided with a plurality of screw conveyors 121 each of which communicate with a screw conveyor 123 having an outlet opening 124, Figure 5, connected to the bottom of a screw elevator 125. The upper end of screw elevator 125 communicates with a spout 126 which delivers flour from the screw elevator to a surge hopper 127. The lower end of surge hopper 127 communicates with a sifter 130 and a suitable valve 131 is provided for controlling the flow of flour between the surge hopper and the sifter. Flour leaves the sifter through a spout 133 and passes to a rotary feeder 66–a receiving a flow of air from a blower 67–a, said rotary feeder and blower being of the type previously described herein. The flour leaves the rotary feeder 66–a in a flow of air through a conduit 136 which connects with an intake opening 80–a of a multiple outlet valve mechanism indicated generally at 70–a. The valve mechanism 70–a is similar to valve mechanism 70, Figures 3 and 4, in that an intake opening 80–a can be selectively connected with each of a plurality of outlets. The previously described line 76 connects one of the outlets of valve 70–a with the two-way valve 75, Figures 1 and 3, at the entrance to scale hopper 20. Another outlet of valve 70–a is connected to trailer connection panel 119 by a line 151. The three other outlets of valve 70–a communicate with storage bins 112, 113, and 114 through the lines 137, 138, and 139, respectively.

In view of the above, and as seen in Figures 5 and 6, the operator can, by means of multiple outlet valve 70–a, connect line 136 to line 76 leading to the scale hopper 20 whereby flour from sifter 130 can be transferred to the scale hopper by means of rotary feeder 66–a and blower 67–a. During such transfer operation valve 75 is set to connect line 76 with intake line 72 leading to scale hopper 20.

Figure 7:
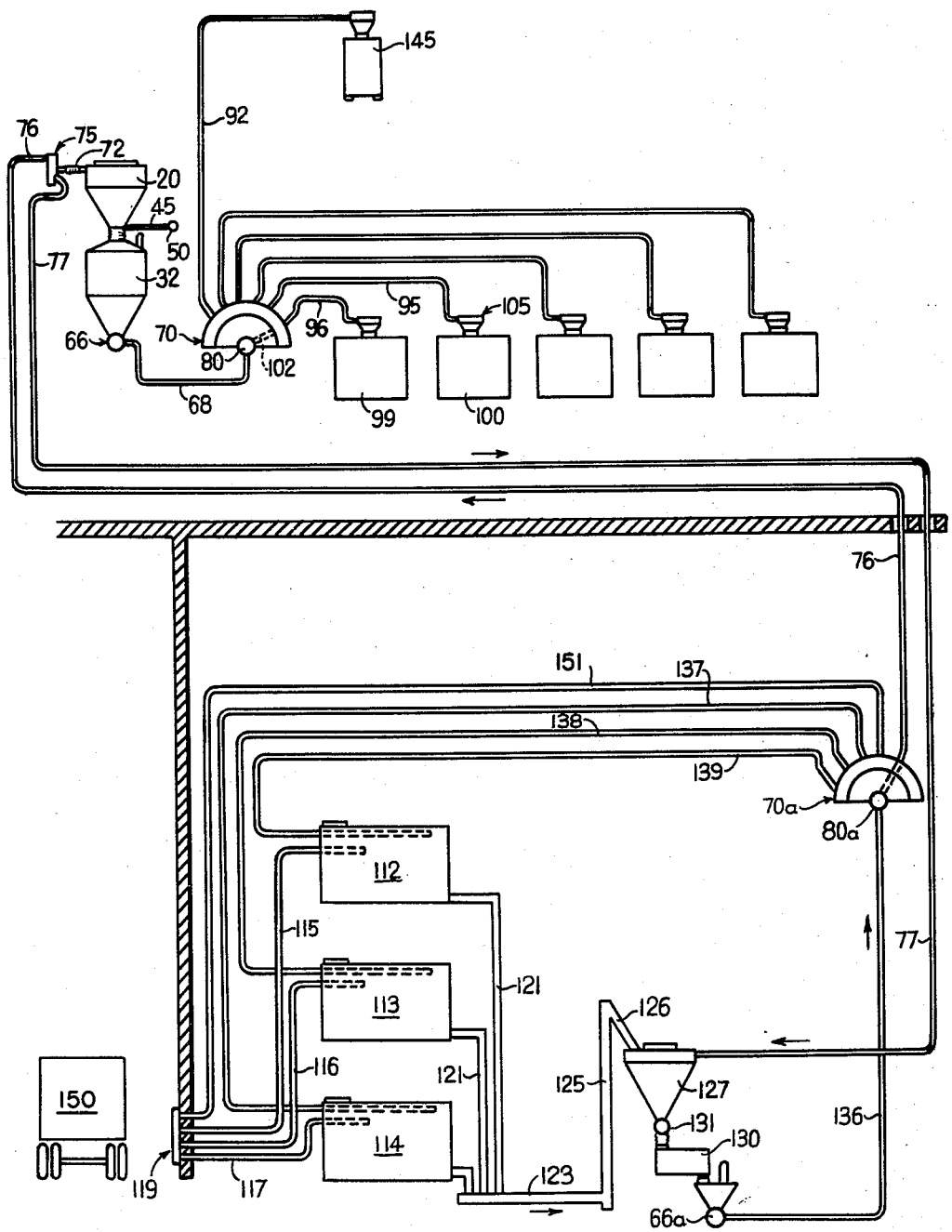
Figure 7 is a diagrammatic view of an entire flour handling system constructed according to the present invention.

When the desired weight of flour has been delivered from sifter 130, two-way valve 75 is actuated to connect line 76 with return line 77. As seen in Figures 5, 6, and 7, return line 77 leads directly to surge hopper 127 which dissipates the velocity of the return flow of flour and air. The returned flour can be transferred to sifter 130 by actuation of previously mentioned valve 131. From the shifter 130 the returned flour can again be sent to the scale hopper as required.

It will further be noted from Figures 5, 6, and 7 that the operator can connect intake 80–a of valve mechanism 70–a with either of the lines 137, 138, and 139 whereby flour can be transferred from surge hopper 127 and sifter 130 back to any of the storage bins 112, 113, and 114.

Reference is next made to Figure 7 which diagrammatically illustrates the entire flour handling system in one view. Flour is delivered from a vehicle 150 to the trailer connection panel 119 from where it is transferred to any of the storage compartments 112, 113, and 114.

When the operator desires flour from a particular bin, say 112, he actuates one of the screw conveyors 121, main screw conveyor 123, and screw elevator 125 to deliver flour to surge hopper 127. Flour is next passed to sifter 130 by actuation of release valve 131 and rotary feeder 66–a is energized to convey a flow of flour and air through two-way valve 75 to scale hopper 20. When the appropriate weight of flour has been delivered to the scale hopper, valve 75 is actuated to connect line 76 with return line 77 whereby the flow of flour and air is returned to surge hopper 127.

The operator next actuates switch 50 to operate discharge valve 34 and the weighed charge of flour passes from scale hopper 20 to receiver 32. Discharge valve 34 is next closed and the operator adjusts multiple outlet switch 70 to connect line 68 with one of the dough mixers, say 99, to which the weighed charge of flour is to be transferred.

The rotary feeder 66 and blower 67 are next energized to institute a flow of flour and air from receiver 32 to dough mixer 99. At the same time, two-way valve 75 is actuated to connect line 76 with intake line 72 of the scale hopper whereby a second charge of flour is delivered to and weighed in the scale hopper while the previously weighed charge is being transferred from receiver 32 to sponge mixer 99.

After the second charge of flour has been delivered to the scale hopper the cycle is repeated by actuating two-way valve 75 to divert the flow, by actuating the discharge valve 34 to transfer the second charge to receiver 32, and by energizing rotary feeder 66 and blower 67 after multiple outlet valve 70 has been actuated to connect intake 80 thereof with another of the dough mixers, such as 100.

As seen in Figure 7, one of the outlets of multiple conduit switch 70 can be connected, by line 92, to supply flour to a dusting bin 145 as well as to the various dough mixers.

After the particular mixing operation is completed and it is desired to utilize another type of flour, the operator adjusts multiple outlet valve 70–a to connect line 136 with one of the lines 137, 138, or 139. The rotary feeder 66–a and blower 67–a are energized to clear the sifter 130 and surge hopper 127 of the remaining flour left over from the completed baking operation, such remaining flour being returned to the appropriate bin 112, 113, or 114. The desired flour type is next transferred from the appropriate bin to the surge hopper and sifter in the manner previously described.

Reference is next made to Figure 8 which diagrammatically illustrates another flour handling system similar to that of Figure 7 except that diverter valve 75, return line 77 from valve 75 and surge hopper 127, Figure 7, are eliminated in the system of Figure 8. Other components of Figure 8 that correspond with identical components of Figure 7 are designated by identical numerals. The elements 77, 75, and 127 are eliminated from the system of Figure 8 by the incorporation of a novel structural arrangement comprising a residue hopper 150 disposed above scale hopper 20 and communicating therewith via a shut-off valve 152. The flour delivery lines 136 and 76 leading from rotary feeder 66–a connects directly with residue hopper 150.

With continued reference to Figure 8, after the required weight of flour has been delivered to scale hopper 20 via lines 136 and 76 and residue hopper 150, then shut-off valve 152 is automatically closed, by suitable control means, not illustrated, said control means being operatively associated with the weighing mechanism 45 of scale hopper 20 so as to close valve 152 responsive to the delivery of the required charge of flour to scale hopper 20. The operation of rotary feeder 66–a is also automatically terminated by a suitable automatic control means, not illustrated, responsive to the delivery of said charge to scale hopper 20, but the operation of blower 67–a for rotary feeder 66–a is continued so as to deliver a flow of air through lines 136 and 76 for a period of time necessary to clear delivery lines 136 and 76 of flour. During such period of time the flour cleared from lines 136 and 76 is delivered to and collected in residue hopper 150 but can not enter scale hopper 20 since shut-off valve 152 is closed. When it is desired to again charge scale hopper 20 with flour, shut-off valve 152 is automatically opened by the previously mentioned automatic control apparatus whereby the residue flour cleared from lines 136 and 76 during the previous cycle is released from residue hopper 150 to scale hopper 20. When the mixture of flour and air is being delivered to residue hopper 150 the conveying air is released through a filter 154 formed of porous fabric forming a top closure for residue hopper 150. A similar filter top closure 155 may also be provided in the top of receiver 32 for the escape of air from the receiver when flour is delivered thereto from scale hopper 20.

From the above description it will be understood that in the system of Figure 7 flour is cleared from delivery lines 136 and 76 by the incorporation of diverter valve 75, return conduit 77, and surge hopper 127. Such clearing of delivery lines 136 and 76 is necessary since if flour is allowed to come to rest in the delivery lines the lines will become plugged upon institution of the next flour delivery cycle. In the system of Figure 8, however, the same problem of clearing the delivery lines of flour is present but the problem is solved in a different manner, i.e. by the incorporation of the above described residue hopper 150 and shut-off valve 152 which provide means for clearing delivery lines 136 and 76 after each successive charge is delivered to scale hopper 20. Hence it will be understood that the system of Figure 8 does not require the relative expensive diverter valve 75 and return conduit. Moreover, the system of Figure 8 does not require a surge hopper such as is illustrated at 127 in Figure 7 whereby flour can be delivered directly from screw elevator 125 to sifter 130.

While the forms of embodiments of the present invention as herein disclosed constitute preferred forms, it is to be understood that other forms might be adopted, all coming within the scope of the claims which follow.

I claim:

1. A pneumatic conveying system for the automatic handling of finely divided particles of material, a scale hopper; a first particle transporting means for conducting a flow of said material to said scale hopper for weighing a charge thereof; a receiver; means for transferring said weighed charge of material to said receiver; a plurality of mixers; a second particle transporting means for transferring said weighed charge from said receiver to one of said plurality of mixers while a second flow is being delivered to said scale hopper by said first particle transporting means; and means for selectively connecting each of said plurality of mixers to said receiver.

2. A pneumatic conveying system for handling flour comprising, in combination, a scale hopper for receiving and weighing an amount of flour required at a mixing unit; flour transporting means for delivering flour to said scale hopper; a receiver connected with said scale hopper for receiving a charge of flour therefrom; valve means for controlling the flow of flour between said scale hopper and said receiver; a plurality of mixing units; a multiple outlet valve means having an inlet communicating with said receiver and selectively connectable with a plurality of outlets communicating with said mixing units; and a second flour transporting means for delivering a charge of flour from said receiver through said valve means to one of said mixers while a subsequent charge of flour is being delivered to said scale hopper by said first mentioned flour transporting means.

3. A pneumatic conveying system for handling flour comprising, in combination, a scale hopper for receiving and weighing an amount of flour required at a mixing unit; means forming a source of flour for said scale hopper; conduit means connecting said source with said scale hopper; flour transporting means for producing a flow of flour in said conduit means; a receptacle for said flow of flour in said conduit means; valve means for connecting said conduit means to said receptacle to divert said flow from said scale hopper to said receptacle; a receiver connected with said scale hopper for receiving a charge of flour therefrom; a second valve means for controlling the flow of flour from said scale hopper to said receiver; a plurality of mixing units; a multiple outlet valve means having an inlet communicating with said receiver and selectively connectable with a plurality of outlets communicating with said mixing units; and a second flour transporting means for delivering a charge of flour from said receiver through said valve means to one of said mixers while a subsequent charge of flour is being delivered to said scale hopper by said first mentioned flour transporting means.

4. Mechanism defined in claim 3 characterized by said receptacle being connected to said first mentioned flour transporting means whereby flour in said flow diverted from said conduit means can be again transported through said conduit means.

5. Mechanism defined in claim 2 characterized by said means for delivering flour to said scale hopper including a sifter.

6. A pneumatic conveying system for handling flour comprising, in combination, means for successively weighing charges of flour; a receiver connected with said weighing means for receiving a charge of flour therefrom; a plurality of mixing units; storage means for containing a supply of flour for charging said weighing means; a first conduit means for delivering flour to said weighing means; a two-way diverting valve means connected to said first conduit means; fluid energy translating means for imparting kinetic energy to a flow of flour to said valve means; a second conduit means for said flow of flour from said fluid energy translating means to said valve means; a receptacle for receiving said flow of flour; a third conduit means for transporting said flow of flour from said valve means to said receptacle; actuating means for said valve means whereby said second conduit means can be selectively either connected to said first conduit means or to said third conduit means; a plurality of mixing units; a multiple outlet valve means having an inlet communicating with said receiver and selectively connectable with a plurality of outlets communicating with said mixing units; and flour transporting means for delivering a charge of flour from said receiver through said valve means to one of said mixers while a subsequent charge of flour is being delivered to said scale hopper by said fluid energy translating means.

7. A pneumatic conveying system for handling flour comprising, in combination, means for successively weighing charges of flour; a receiver connected with said weighing means for receiving a charge of flour therefrom; a plurality of mixing units; storage means for containing a supply of flour for charging said weighing means; a first conduit means for delivering flour to said weighing means; a two-way diverting valve means connected to said first conduit means; fluid energy translating means for imparting kinetic energy to a flow of flour to said valve means; a second conduit means for said flow of flour from said fluid energy translating means to said valve means; a surge hopper for receiving said flow of flour; a third conduit means for transporting said flow of flour from said valve means to said surge hopper; actuating means for said valve means whereby said second conduit means can be selectively either connected to said first conduit means or to said third conduit means; a plurality of mixing units; a multiple outlet valve means having an inlet communicating with said receiver and selectively connectable with a plurality of outlets communicating with said mixing units; and flour transporting means for delivering a charge of flour from said receiver through said valve means to one of said mixers while a subsequent charge of flour is being delivered to said scale hopper by said fluid energy translating means.

8. A pneumatic conveying system for handling flour comprising, in combination, means for successively weighing charges of flour; a receiver connected with said weighing means for receiving a charge of flour therefrom; a plurality of mixing units; storage means for containing a supply of flour for charging said weighing means; a first conduit means for delivering flour to said weighing means; a two-way diverting valve means connected to said first conduit means; fluid energy translating means for imparting kinetic energy to a flow of flour to said valve means; a second conduit means for said flow of flour from said fluid energy translating means to said valve means; a surge hopper for receiving said flow of flour; a third conduit means for transporting said flow of flour from said valve means to said surge hopper; actuating means for said valve means whereby said second conduit means can be selectively either connected to said first conduit means or to said third conduit means; a fourth conduit means for delivering flour from said surge hopper to said fluid energy translating means; a plurality of mixing units; a multiple outlet valve means having an inlet communicating with said receiver and selectively connectable with a plurality of outlets communicating with said mixing units; and flour transporting means for delivering a charge of flour from said receiver through said valve means to one of said mixers while a subsequent charge of flour is being delivered to said scale hopper by said fluid energy translating means.

9. A pneumatic conveying system for handling flour comprising, in combination, means for successively weighing charges of flour; a receiver connected with said weighing means for receiving a charge of flour therefrom; a plurality of mixing units; storage means for containing a supply of flour for charging said weighing means; a first conduit means for delivering flour to said weighing means; a two-way diverting valve means connected to said first conduit means; fluid energy translating means for imparting kinetic energy to a flow of flour to said valve means; a second conduit means for said flow of flour from said fluid energy translating means to said valve means; a receptacle for receiving said flow of flour; a third conduit means for transporting said flow of flour from said valve means to said receptacle; actuating means for said valve means whereby said second conduit means can be selectively either connected to said first conduit means or to said third conduit means; a sifter for receiving flour from said receptacle; a fourth conduit means for connecting said sifter to said fluid energy translating means; a plurality of mixing units; a multiple outlet valve means having an inlet communicating with said receiver and selectively connectable with a plurality of outlets communicating with said mixing units; and flour transporting means for delivering a charge of flour from said receiver through said valve means to one of said mixers while a subsequent charge of flour is being delivered to said scale hopper by said fluid energy translating means.

10. A pneumatic conveying system for handling flour comprising, in combination, means for successively weighing charges of flour; a receiver connected with said weighing means for receiving a charge of flour therefrom; a plurality of mixing units; storage means for containing a supply of flour for charging said weighing means; a first conduit means for delivering flour to said weighing means; a two-way diverting valve means connected to said first conduit means; fluid energy translating means for imparting kinetic energy to a flow of flour to said valve means; a second conduit means for said flow of flour from said fluid energy translating means to said valve means; a receptacle for receiving said flow of flour; a third conduit means for transporting said flow of flour from said valve means to said receptacle; actuating means for said valve means whereby said second conduit means can be selectively either connected to said first conduit means or to said third conduit means; a fourth conduit means for delivering flour from said storage means to said fluid energy translating means; means for moving flour through said fourth conduit means; a plurality of mixing units; a multiple outlet valve means having an inlet communicating with said receiver and selectively connectable with a plurality of outlets communicating with said mixing units; and flour transporting means for delivering a charge of flour from said receiver through said valve means to one of said mixers while a subsequent charge of flour is being delivered to said scale hopper by said fluid energy translating means.

11. Mechanism defined in claim 6 characterized by said receptacle being connected to said fluid energy translating means; and a second valve means for controlling the flow of flour from said receptacle to said fluid energy translating means.

12. Mechanism defined in claim 9 characterized by a second valve means for controlling the flow of flour from said receptacle to said fluid energy translating means.

13. An apparatus for handling flour comprising, in combination, a scale hopper for receiving and weighing an amount of flour required at a mixing unit; a residue hopper for delivering flour to said scale hopper; valve means for controlling the flow of flour between said residue hopper and said scale hopper; pneumatic flour delivery means for delivering flour to said residue hopper; a receiver connected with said scale hopper for receiving a charge of flour therefrom; valve means for controlling the flow of flour between said scale hopper and said receiver; a plurality of mixing units for receiving charges of flour from said receiver; and means for selectively transporting charges of flour from said receiver to each of said plurality of mixing units.

14. An apparatus for handling flour comprising, in combination, a scale hopper for receiving and weighing an amount of flour required at a mixing unit; a residue hopper for delivering flour to said scale hopper; valve means for controlling the flow of flour between said residue hopper and said scale hopper; pneumatic flour delivery means for delivering flour to said residue hopper; a receiver connected with said scale hopper for receiving a charge of flour therefrom; valve means for controlling the flow of flour between said scale hopper and said receiver; a plurality of mixing units for receiving charges of flour from said receiver; means for selectively transporting charges of flour from said receiver to each of said plurality of mixing units; and control means operatively responsive to said scale hopper for actuating said first mentioned valve means when a predetermined weight of flour has been delivered to said scale hopper.

15. A pneumatic conveying system for the automatic handling of finely divided particles of material comprising, in combination, a first particle transporting means for adding said particles to a flow of air; a scale hopper; a first conduit means for conducting said flow of air and particles to said scale hopper for weighing a charge thereof; a first valve means for terminating said flow of particles and air to said scale hopper; a residue hopper; means for terminating said adding of particles to said flow while continuing said flow to said residue hopper until said flow is freed of said particles; transferring said weighed charge of material to said receiver; a mixer; and a second particle transporting means for transferring said weighed charge from said receiver to said mixer while a second flow is being delivered to said scale hopper by said first particle transporting means.

16. A pneumatic conveying system for the automatic handling of finely divided particles of material comprising, in combination, a scale hopper; a first particle transporting means for adding said material to a flow of air; a conduit means for conducting a flow of air and said material to said scale hopper for weighing a charge thereof; a first valve means at the entrance to said scale hopper for terminating the delivery of said hopper; a residue hopper; means for terminating the addition of said material to said flow of air whereby said flow delivers the contents of said conduit means to said residue hopper; a receiver; a second valve means for transferring said weighed charge of material to said receiver; a plurality of mixers; and a second particle transporting means for transferring said weighed charge from said receiver to one of said plurality of mixers while a second flow is being delivered to said scale hopper by said first particle transporting means.

17. A pneumatic conveying system for the automatic handling of finely divided particles of material, said system comprising, in combination, storage means including a first compartment for storing a supply of said material; conduit means leading from said first compartment; flour transporting means for adding said material from said first compartment to a stream of air to deliver a flow of air and particles through said conduit means; a scale hopper including an inlet and an outlet; a residue hopper including a second compartment for receiving said flow of air and particles from said first compartment; valve means including a normally open position during operation of said flour transporting means whereby said flow of air and particles in said conduit means passes through said valve means to said scale hopper, said valve means including a closed position wherein said flow is delivered to said second compartment formed by said residue hopper to deposit the conduit line charge therein; control means for said valve means for moving said valve means from said normally open position to said closed position responsive to the weighing of a charge at said scale hopper; and means for terminating the adding of said material to said stream of air whereby said stream clears said conduit means of a line charge of material and delivers said line charge to said residue hopper.

18. A pneumatic conveying system for the automatic handling of finely divided particles of material, said system comprising, in combination, storage means including a first compartment for storing a supply of said material; conduit means leading from said first compartment; flour transporting means for adding said material from said first compartment to a stream of air to deliver a flow of air and particles through said conduit means; a scale hopper including an inlet and an outlet; a residue hopper including a second compartment separate from said first compartment for receiving said flow of air and particles from said first compartment and an outlet communicating with said inlet of said scale hopper; valve means including a normally open position during operation of said flour transporting means whereby said flow of air and particles in said conduit means passes through said valve means to said scale hopper, said valve means including a closed position wherein said flow is delivered to said second compartment formed by said residue hopper to deposit the conduit line charge therein; control means for said valve means for moving said valve means from said normally open position to said closed position responsive to the weighing of a charge at said scale hopper; and means for terminating the adding of said material to said stream of air whereby said stream clears said conduit means of a line charge of material and delivers said line charge to said residue hopper.

19. A pneumatic conveying system for the automatic handling of finely divided particles of material, said system comprising, in combination, storage means including a first compartment for storing a supply of said material; conduit means leading from said first compartment; flour transporting means for adding said material from said first compartment to a stream of air to deliver a flow of air and particles through said conduit means; a scale hopper including an inlet and an outlet; a residue hopper including a second compartment for receiving said flow of air and particles from said first compartment; valve means including a normally open position during operation of said flour transporting means whereby said flow of air and particles in said conduit means passes through said valve means to said scale hopper, said valve means including a closed position wherein said flow is delivered to said second compartment formed by said residue hopper to deposit the conduit line charge therein; control means for said valve means for moving said valve means from said normally open position to said closed position responsive to the weighing of a charge at said scale hopper; means for terminating the adding of said material to said stream of air whereby said stream clears said conduit means of a line charge of material and delivers said line charge to said residue hopper; a plurality of mixers; a second valve including a valve inlet, a plurality of valve outlets, and means for selectively connecting each of said valve outlets to said valve inlet; a conduit connecting said scale hopper outlet to said valve inlet; and a plurality of conduits each of which connects one of said valve outlets with a respective one of said plurality of mixers.

20. A pneumatic conveying system for the automatic handling of finely divided particles of material, said system comprising, in combination, storage means including a first compartment for storing a supply of said material; conduit means leading from said first compartment; flour transporting means for adding said material from said first compartment to a stream of air to deliver a flow of air and particles through said conduit means; a scale hopper including an inlet and an outlet; a residue hopper including a second compartment for receiving said flow of air and particles from said first compartment; valve means including a normally open position during operation of said flour transporting means whereby said flow of air and particles in said conduit means passes through said valve means to said scale hopper, said valve means including a closed position wherein said flow is delivered to said second compartment formed by said residue hopper to deposit the conduit line charge therein; control means for said valve means for moving said valve means from said normally open position to said closed position responsive to the weighing of a charge at said scale hopper; means for terminating the adding of said material to said stream of air whereby said stream clears said conduit means of a line charge of material and delivers said line charge to said residue hopper; a plurality of mixers; a second valve including a valve inlet, a plurality of valve outlets, and means for selectively connecting each of said valve outlets to said valve inlet; a conduit connecting said scale hopper outlet to said valve inlet; a plurality of conduits each of which connects one of said valve outlets with a respective one of said plurality of mixers; and receiver means between said outlet of said scale hopper and said mixers for temporarily storing successively weighed charges from said scale hopper.

References Cited in the file of this patent

UNITED STATES PATENTS

| 2,572,862 | Israel | Oct. 30, 1951 |
| 2,581,853 | Glaza | Jan. 8, 1952 |
| 2,688,517 | Riordan | Sept. 7, 1954 |
| 2,688,518 | Krenke | Sept. 7, 1954 |
| 2,795,463 | Weller | June 11, 1957 |
| 2,810,609 | Temple | Oct. 22, 1957 |

FOREIGN PATENTS

| 437,475 | Germany | Nov. 20, 1926 |

UNITED STATES PATENT OFFICE
CERTIFICATE OF CORRECTION

Patent No. 2,913,279                    November 17, 1959

Frederic D. Pfening

It is hereby certified that error appears in the printed specification of the above numbered patent requiring correction and that the said Letters Patent should read as corrected below.

Column 9, lines 72 and 73, strike out "transferring said weighed charge of material to said receiver;" and insert instead -- a receiver connected with said scale hopper for receiving a weighed charge of said material therefrom; --; column 10, line 10, for "delivery of" read -- delivery to --.

Signed and sealed this 6th day of September 1960.

(SEAL)
Attest:
ERNEST W. SWIDER
Attesting Officer

ROBERT C. WATSON
Commissioner of Patents